United States Patent [19]

Kunz

[11] 4,171,087
[45] Oct. 16, 1979

[54] CONTROL VALVE

[75] Inventor: Bernard L. Kunz, Collinsville, Ill.

[73] Assignee: Emerson Electric Co., St. Louis, Mo.

[21] Appl. No.: 848,157

[22] Filed: Nov. 3, 1977

[51] Int. Cl.² ........................................... F16K 31/18
[52] U.S. Cl. .................................. 236/68 R; 251/11; 236/92 B
[58] Field of Search ............. 236/68 R, 92 B; 251/11; 137/312; 62/222, 505, 498, 196 B, 202

[56] References Cited

U.S. PATENT DOCUMENTS

| | | | |
|---|---|---|---|
| 2,049,204 | 7/1936 | Jacobsen | 137/312 |
| 3,405,535 | 10/1968 | Matthies | 236/92 B |
| 3,967,781 | 7/1976 | Kunz | 236/92 B |
| 4,010,769 | 3/1977 | DeLorenzo et al. | 137/312 |
| 4,043,532 | 8/1977 | Draxler | 236/68 R |

*Primary Examiner*—William E. Wayner
*Attorney, Agent, or Firm*—Polster, Polster and Lucchesi

[57] ABSTRACT

An expansion valve for a refrigeration system, and in particular, for a reversible flow or heat pump application is provided in which the valve is electrically operated by a heat motor mounted to a valve body. The valve includes a valve stem operatively connected to the heat motor. The valve stem position, and consequently, valve operation, is controlled by heat motor operation. Because of the reverse flow nature of the fluid flow in the system described, means for protecting the heat motor from fluid leakage is necessary, if the valve is to function properly. The valve of this invention includes bleed or drain means positioned to drain fluid from the heat motor, and seal means on the valve stem of the valve to reduce flow leakage along the stem.

11 Claims, 3 Drawing Figures

CONTROL VALVE

BACKGROUND OF THE INVENTION

This invention relates to expansion valves for refrigeration systems, and in particular, to an electrically operated expansion valve. While the invention is described in particular detail with respect to expansion valve applications, those skilled in the art will recognize the wider applicability of the inventive principles described hereinafter.

Refrigeration systems generally include an evaporator, a compressor, and a condenser. Refrigerant vapors drawn from the evaporator by the compressor are forced into the condenser, where the vapor liquifies. The liquid refrigerant then is returned to the evaporator through an expansion valve. The expansion valve converts the refrigerant from a high pressure liquid to a low pressure vapor plus liquid by passing the refrigerant through a restriction in the valve. Control of refrigerant input to the evaporator can be maintained by inserting a valve member in the restriction of the expansion valve, and adjusting the valve member positioned in response to a particular external condition.

Presently, thermostatic expansion valves are utilized extensively for refrigerant control. While working for their intended purpose, thermostatically controlled valves are relatively complicated in their manufacture. In addition, in heat pump applications, two valves are required, as generally speaking the valves must be adjusted to the corresponding refrigerant coil with which they operate.

To overcome these deficiencies, electrically controlled expansion valves have been developed. One particular valve for refrigerant systems is described in the U.S. Pat. to Kunz, No. 3,967,781, assigned to the assignee of the present invention. The Kunz patent discloses a valve utilizing a heat motor to control the valve stem position, and consequently, valve operation. The valve disclosed in Kunz U.S. Pat. Nos. 3,967,781 was primarily designed for conventional refrigeration systems in which the fluid flow to the valve is in a single direction. When the valve disclosed in U.S. Pat. No. 3,967,781 is employed in heat pump applications, that is, in applications where fluid through the valve passed in two directions, several problems with valve operation are encountered. While the valve would operate satisfactorily for controlling flow in one direction through the valve, the passage of fluid in the opposite direction often resulted in leakage from the valve body to the heat motor. That is to say, the reversal of the high pressure and low pressure sides of the valve places high pressure fluid on a side of the valve stem normally at low pressure in one way flow applications. Fluid leakage to the heat motor generally is the result. Such leakage causes malfunction in heat motor operation, with consequent eratic operation of the valve.

The invention disclosed hereinafter overcomes the deficiencies encountered with electrically operated valves in heat pump applications, by incorporating a number of protective features designed to prevent refrigerant flow into the heat motor of the valve. While these improvements were designed primarily for heat pump applications, the valve may find application in other two-way systems, and of course, also may be used in conventional one-way flow systems including conventional refrigeration systems.

One of the objects of this invention is to provide an improved electrically operated control valve.

Another object of this invention is to provide an electrically operated valve for heat pump applications.

Another object of this invention is to provide an expansion valve compatible with heat pump applications, the operation of which is dependent solely on an electrical input.

Another object of this invention is to provide an electrically operated valve for refrigeration control incorporating means for preventing fluid leakage to the electrically controlled apparatus of the valve.

Other objects of this invention will be apparent to those skilled in the art in light of the following description and accompanying drawings.

SUMMARY OF THE INVENTION

In accordance with this invention, generally stated, an electrically operated valve is provided with structure for minimizing leakage of fluid along a valve stem of a valve into a heat motor associated with the valve. The valve includes a valve body having a fluid passage through it. The fluid passage has a reduced diameter formed along it, which delimits a valve port. A valve stem is movably mounted in the valve body between a first position closing the valve port, and at least one second position. A heat motor is mounted to the valve body and is operatively connected to the valve stem. The heat motor includes a plurality of heating elements arranged alternately with a plurality of bimetallic discs within a suitable enclosure. Application of electrical energy to the heating elements causes the discs to expand. The heater/disc combination is operatively connected to the valve stem, so that movement of the bimetallic discs causes the valve stem to move towards its second position, opening the valve port. The valve stem is provided with a ring seal along its axial length, and the valve has a drain tube formed in it, on the heat motor side of the valve body. The drain tube permits the heat motor to be vented to a source of low pressure, when required by valve application.

DESCRIPTION OF THE PREFERRED EMBODIMENT

Figure 1:
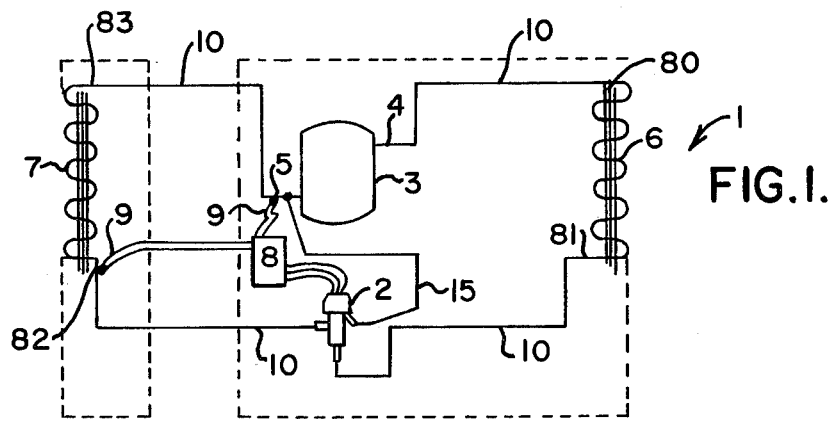
FIG. 1 is a view of a one-way refrigerant flow system in which the valve 1 of this invention finds application.

Referring now to FIG. 1, reference numeral 1 indicates a refrigeration system employing a valve 2 of this invention.

The refrigeration system 1 includes a compressor 3, having a high pressure side 4 and a low pressure or suction side 5. The high pressure side 4 is connected to a first end 80 of a condensing coil 6. The condensing coil 6 converts the high pressure gas to a high pressure liquid. A second end 81 of the coil 6 is connected to the inlet side of the valve 2. The outlet side of the valve 2 is connected to a first end 82 of an evaporator coil 7. As is apparent, fluid flow to the evaporator 7 is controlled by valve 2 operation. A second end 83 of the coil 7 is connected to the low pressure side 5 of the compressor 3. A control means 8 includes a plurality of sensors 9 for monitoring operation of the system 1. The control means 8 functions to regulate the electrical input to the valve 2, as later described in greater detail. The condenser, evaporator, compressor and valve are interconnected with one another along a refrigerant line 10 in a conventional manner.

Figure 2:
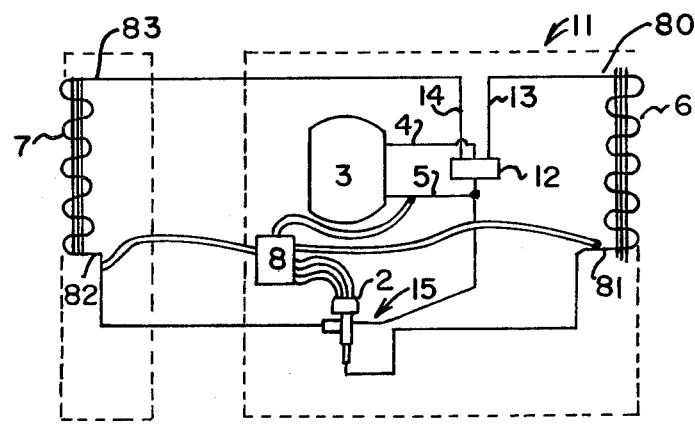
FIG. 2 is a diagrammatic view of a heat pump application in which the valve of this invention finds application.

FIG. 2 illustrates a heat pump system 11 which employs the valve 2 of this invention. Like parts bear like reference numerals in FIG. 2, where appropriate. As there shown, the compressor 3 has its discharge or high pressure side 4 connected to a four-way reversing valve 12. The valve 12 has a working line 13 connected to the end 80 of coil 6, and a working line 14 connected to the end 83 of the coil 7. The second end 81 of the coil 6 is connected to end 82 of the coil 7 through the valve 2. The low pressure or suction side 5 of the compressor 4 is attached to the reversing valve 12. The reversing valve 12 operates to alternate the function of the coils 6 and 7. For example, in the air conditioning mode, the coil 6 may be the condenser, while in the heating mode the coil 6 functions as an evaporator, coil 7 having opposite functions in those respective modes. In any event, the valve 2 has a drain means 15 connected to the low pressure or suction side of the compressor 3.

Figure 3:
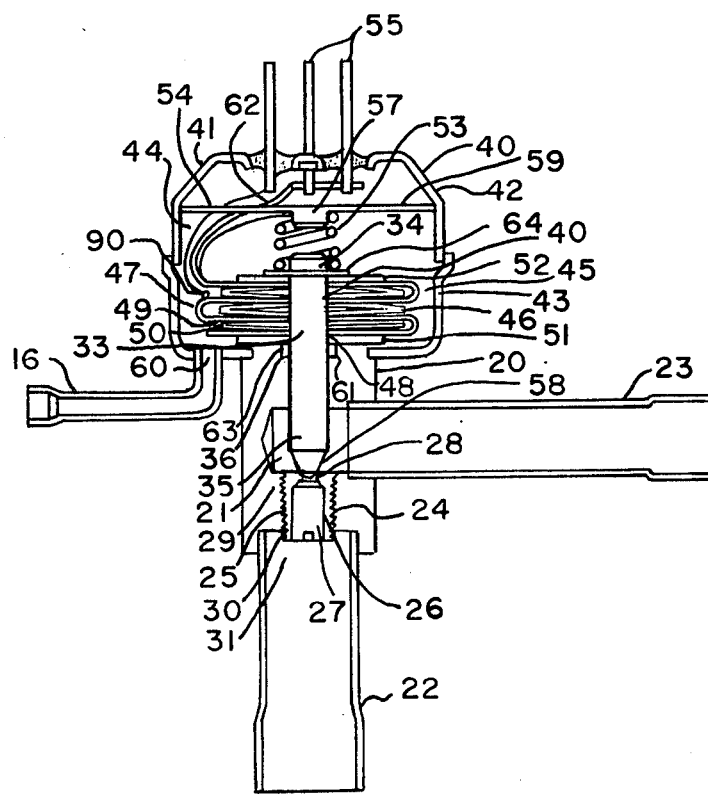
FIG. 3 is a sectional view of the valve of this invention.

Referring now to FIG. 3, it may be observed that the valve 2 includes a body portion 20. The body portion 20 has a passage 21 through it. A pair of connectors 22 and 23, respectively, are mounted to the body 20 and communicate with the passage 21. Attachment between the connectors and body may be made by any convenient method, and welding or brazing works well, for example. The passage 21 has an internal wall 24 having a threaded portion 25 formed in it. A valve seat 26 has an externally threaded surface, the threads of that surface being complimentary with the threads 25 of the wall 24. Valve seat 26 has an axial opening 27 through it. The opening 27 includes a restriction 28 defining the valve port for the valve 2, the restriction 28 being positioned along an end 29 of the valve seat 26. An end 30 of the seat 26 has an adjustment slot 31 formed in it, the function of which is described hereinafter.

A valve stem 33 is movably mounted within the body 20. Stem 33 has a first end 34 and a second end 35. The end 35 defines a dual angle valve pin 58. In the embodiment illustrated, the valve pin 58 portion of the stem 33 has two distinct slope parts, a first formed with a thirty degree slope angle, and a second formed with a sixty degree slope angle. The dual angle valve pin stabilizes valve 2 operation at low rates of flow through the passage 21.

The valve stem 33 has a ring seal 36 about its circumference at some point along the length of the valve stem positioned within the valve body 20, between the passage 21 and the mounting location on the valve body 20 of a heat motor 40. The ring seal 36 functions to minimize leakage of the refrigerant from the passage 21 to the heat motor 40 along the stem 33. Valve body 20 may have a groove 61 formed in it, sized to receive the ring 36 in a conventional manner. An interference fit retainer 63 may be mounted within the groove 61 on the heat motor side of the ring seal 36 to maintain ring 36 position.

Heat motor 40 includes a casing or enclosure 41. The casing 41, in the embodiment illustrated, is defined by a top 42 and a bottom 43 which are intermountable with one another to delimit a chamber 44. The bottom 43 is attached to the body 20 of the valve 2 in a conventional manner. Again, usual welding or brazing techniques may be employed, if desired. The end 34 of the valve stem 33 is positioned within the chamber 44. An electrically operable means 45 is mounted to the valve stem 33 along the end 34 of the stem. The electrically operable means 45 includes a plurality of bimetallic discs 46 interleaved between a plurality of heater elements or means 47.

Each of the bimetallic discs 46 are annular in plan, having a central opening 48 through them. The bimetallic discs 46 conventionally comprise a first metal disc 49 and a second metal disc 50 having substantially different coefficients of expansion, which are bonded along their mating surfaces by any convenient method.

The heater element 47, in the embodiment illustrated, is a film of insulating material having a resistive element deposited on it, and enclosed in a second film of insulating material. The material is provided with openings in it, so that it may be folded upon itself for interleaving with the discs 46. The electrically operable means 45 and disc 46 arrangement is similar to that disclosed in copending Behr United States application, Ser. No. 761,291, filed Jan. 21, 1977, now U.S. Pat. No. 4,086,983 and assigned to the assignee of the present invention. Details of the electrically operable means structure not set out herein are intended to be incorporated by reference. The discs 46 and heater element 47 are mounted over the end 34 of the valve stem 33, between a support 51 and a support 52 and secured with a retaining ring 64. A spring 53 is biased between the retaining ring 64 and a stop 54 remote from the end 34 of the valve stem, the stop 54 being positioned within the chamber 44.

Stop 54 may comprise a variety suitable structural arrangements mounted within the chamber 44 for providing the required support for the spring 53. In the embodiment illustrated, stop 54 has a central spring retainer 57 supported from a plurality of arms 59. The arms 59 are engaged frictionally at their radially outer ends by the top 42 of the casings 41. Other structural arrangements are compatible with the broader aspects of this invention.

Four terminals 55 extend through the top 42 of the casing 41. Two of the terminals are electrically connected within the chamber to the heater element 47 along suitable conductors 62. The terminals 55 also are electrically connected to the control means 8 of the systems shown in FIGS. 1 and 2.

The bottom 43 of casing 41 has a scavage port 60 formed in it. Port 60 is connected to the chamber 44 of the heat motor 40, on one end thereof, and to a connector 16 on a second end thereof. The connector 16 and port 60 define the drain means 15 of the preferred embodiment of this invention.

Operation of the valve 2 is relatively simple to understand. As shown in FIGS. 1 and 2, the valve is compatible with both conventional refrigeration and heat pump applications. It may be observed, in FIG. 3, that a chain of bimetallic disc and heater elements of the electrically operable means 45 are in abutting relationship and with the supports 51 and 52 and retaining ring 64. The retaining ring 64 in turn, is mechanically coupled to the valve stem 33. The spring 53 biases the valve stem towards its closed position. Fluid flow through the connector 22, for example, will be restricted as long as the force exerted by the spring 53 is not overcome. The spring force is overcome both by the pressure on the valve stem exerted by the fluid in the valve 2, and by the operation of the heat motor 40. As indicated, the terminals 55 are connected to the control means 8 which senses operation of the system in which the valve finds application by means of the sensors 9. The control means 8 activates the heater means 47 whenever a predetermined condition is sensed. Application of electrical energy to the heater means 47 causes it to radiate thermal energy as the electrical energy dissipates in the heater elements. That is to say, the amount of voltage applied to the heater means 47 will increase or decrease the heat supplied to the discs 46. The alternating relationship of the bimetallic discs 46 and the heater means 47 components ensures that excellent heat transfer occurs between those parts. Since the discs 46 comprise two different metal discs 49 and 50, expansion of the metal used for the discs occurs at different rates. Consequently, the discs 46 tend to become bow-shaped with respect to one another. That is, the discs will expand axially causing the support 52 to move upwardly, upwardly being referenced to FIG. 3. Such movement, against the bias of the spring 53, moves the valve stem 33 away from the restriction 28, permitting fluid flow through the valve.

In refrigeration systems, flow through the valve normally is from the connector 22 to the connector 23. That is to say, connector 22 is connected to the high pressure side of the system. Opening of the valve stem 33 would connect the high pressure side of the valve to the low pressure side of the valve, and the fluid tends to pass freely through the valve. In the heat pump application of FIG. 2, however, high pressure may build up within the valve body 20 on the connector 23 side of the restriction 28. High pressure in this portion of the valve tends to force refrigerant fluid along the valve stem, into the chamber 44 of the heat motor 40. Introduction of excessive refrigerant into the heat motor chamber 44 affects the operation of the electrically operable means 45 by drawing heat from the discs 46, thereby adversely affecting valve operation. To decrease or lessen the chance of fluid leakage into the chamber 44, the valve 2 of this invention has the seal 36 positioned along the valve stem 33. In addition, the drain means 15 is provided in the valve structure so that the port 60 may be connected to a source of low pressure, which vents the chamber 44 and keeps it free of refrigerant fluid by permitting the connection of the chamber 44 to the low pressure side of the refrigerant system.

As indicated, the restriction 28 is threadedly engaged within the body 20, and the operating point of the valve can be adjusted by simple screwdriver adjustment along the slot 31 to vary the biasing force of the spring 53, thereby adjusting the operating point of the valve.

From the foregoing, it may be seen that this invention is one well adapted to attain all the ends and objects herein set forth, together with other advantages which are obvious and which are inherent to the structure.

Numerous variations, within the scope of the appended claims, will be apparent to those skilled in the art in light of the foregoing description and accompanying drawings. Thus, the silhouette of the valve may vary in other embodiments of this invention. While particular structural arrangements were illustratively described as preferred, other structural combinations may be utilized, if desired. The number of bimetallic or heater elements used in conjunction with the heat motor, and their relative position may vary in embodiments of this invention. The heat chamber 44 may include temperature sensing means, indicated by the numeral 90 in FIG. 3, for sensing the temperature of either or both the heater elements 47 and the discs 46. Additional electrical conductors between the sensor 90 and control means 8 which are intermounted via the terminals 55 are employed in this situation. The location of the port 60 may be varied in other embodiments of this invention. Likewise, the location of ring seal 36 may be changed. For example, the ring seal 36 may be attached directly to the stem 33 along some suitable notch formed in the shaft, if desired. These variations are merely illustrative.

Having thus described the invention, what is claimed and desired to be secured by Letters Patent is:

1. An electrically operated valve, comprising:
a valve body, said valve body having a first opening and a second opening in it, and a fluid passage in said body communicating between said first and said second openings, said passage having a restriction formed in it;
valve means including a valve stem movably mounted between a first position closing said restriction, and a second position, said valve stem including seal means associated with it for sealing said stem against fluid flow;
means for biasing said valve stem towards said closed position;
heat motor means mounted to said valve body, said heat motor means being operatively connected to said valve stem, said heat motor means including an enclosure defining a chamber, a plurality of heater elements mounted to said valve stem, and a plurality of disc pairs mounted in heat transfer relationship with said heater means, expansion of said discs in one direction acting to move said valve toward an open position;
sensing means for sensing the temperature of said heat motor; and
drain means in said valve, said drain means having a first end and a second end, said first end being connected to the chamber of said heat motor, and said second end opening at a point external of said valve.

2. The valve of claim 1 wherein said seal means comprises a ring seal.

3. The valve of claim 2 wherein said restriction is defined by an element threadedly mounted in said valve body along said passage, movement of said element adjusting the operating point of said valve.

4. An electrically operated valve adapted for use in a refrigeration system, said refrigeration system including a compressor having a high pressure side and a low pressure side, comprising:
a valve body, said valve body having a first opening and a second opening in it, and a fluid passage in said body communicating with said first and said second openings, said passage having a restriction formed in it;
an element threadedly mounted in said valve body along said passage, said element defining said restriction, movement of said element adjusting the operating point of said valve;
valve means including a valve stem movably mounted between a first position closing said restriction, and a second position, said valve stem having a seal means associated with it for sealing the valve stem against fluid flow, said seal means including a ring seal in fluid sealing relationship to said valve stem;
means for biasing said valve stem towards said closed position;

heat motor means mounted to said valve body, said heat motor means being operatively connected to said valve stem, said heat motor means including an enclosure defining a chamber, a plurality of heater elements mounted to said valve stem, and a plurality of disc pairs mounted in heat transfer relationship with said heater means, expansion of said discs in one direction acting to move said valve towards an open position; and drain means in said valve, said drain means having a first end and a second end, said first end being connected to the chamber of said heat motor, and said second end being operatively connected to the low pressure side of the compressor of said refrigeration system.

5. In an electrically operated valve including a valve body, said valve body having a first opening and a second opening in it, and a fluid passage in said body communicating with said first and second openings, said passage having a restriction formed in it, the restriction in said passage being defined by an element threadedly mounted in said valve body, movement of said element acting to adjust the operating point of said valve, a valve stem movably mounted between a first position closing said restriction and a second position, said valve stem having an end for closing said restriction, said end having a first slope and a second slope, means for biasing said stem towards the closed position, and heat motor means mounted to said valve body and operatively connected to said valve stem, said heat motor means including an enclosure defining a chamber, a plurality of heater elements mounted to said valve stem, and a plurality of disc pairs mounted in heat transfer relationship with said heater means, expansion of said discs in one direction acting to move said valve stem toward said second open position, the improvement which comprises means for preventing leakage of fluid from said passage to the chamber of said heat motor, said leakage preventing means including drain means in said valve, said drain means including a port having a first end and a second end, said first end being connected to the chamber of said heat motor, said second end opening at a point external of said valve body, and a ring seal along said valve stem for sealing said stem against fluid flow.

6. The improvement of claim 5 further including sensing means for sensing the temperature of said heat motor.

7. An electrically operated valve, comprising:

a valve body, said valve body having a first opening and a second opening in it, and a fluid passage in said body communicating between said first and said second openings, said passage having a restriction formed in it;

valve means including a valve stem movably mounted between a first position closing said restriction, and a second position opening said valve, and a seal means associated with said valve stem for sealing said stem against fluid flow;

means for biasing the valve stem of said valve means towards said closed position;

heat motor means mounted to said valve body and operatively connected to said valve stem, said heat motor means including an enclosure defining a chamber, means for generating a temperature change mounted to said valve stem, said temperature change generating means including a resistive element for dissipating electrical energy in said motor and means for sensing a temperature change operatively connected to said temperature change generating means, said temperature change sensing means comprising a plurality of expandable elements, each of said expandable elements including a pair of discs, each of said disc pairs having substantially different coefficients of expansion, said expandable elements moving longitudinally in response to a change in temperature, movement of said expandable elements in one direction acting to move said valve stem toward said open position;

drain means in said valve, said drain means having a first end and a second end, said first end being connected to the chamber of said heat motor, said second end opening at a point external of said valve; and sensing means for sensing the temperature of said heat motor.

8. The valve of claim 7 wherein said seal means comprises a ring seal.

9. The valve of claim 8 wherein said restriction is defined by an element threadedly mounted in said valve body along said passage, movement of said element adjusting the operating point of said valve.

10. The valve of claim 9 wherein the end of said valve stem closing said restriction has a first slope and a second slope.

11. The valve of claim 10 wherein said valve body has a groove formed in it for receiving said seal, said valve stem being mounted to said valve body through said groove.

* * * * *